(12) United States Patent
Wu et al.

(10) Patent No.: US 8,353,083 B2
(45) Date of Patent: Jan. 15, 2013

(54) TILT MECHANISM FOR ELECTRONIC DEVICE

(75) Inventors: Kun-Tsan Wu, Shindian (TW); Wei-Shan Hu, Shindian (TW)

(73) Assignee: FIH (Hong Kong) Limited, Kowloon (HK)

( * ) Notice: Subject to any disclaimer, the term of this patent is extended or adjusted under 35 U.S.C. 154(b) by 294 days.

(21) Appl. No.: 12/825,464

(22) Filed: Jun. 29, 2010

(65) Prior Publication Data

US 2011/0156558 A1    Jun. 30, 2011

(30) Foreign Application Priority Data

Dec. 31, 2009   (CN) .......................... 2009 1 0312767

(51) Int. Cl.
*E05D 15/00*  (2006.01)

(52) U.S. Cl. .................. 16/362; 16/368; 16/255

(58) Field of Classification Search .................... 16/362, 16/302, 287, 366, 282; 379/433.11–433.13; 49/246, 248, 253, 208; 361/679.12, 679.27, 679.55; 248/923, 917, 918

See application file for complete search history.

(56) References Cited

U.S. PATENT DOCUMENTS

| | | | | |
|---|---|---|---|---|
| 3,514,893 A | * | 6/1970 | Paksy | 446/486 |
| 6,504,707 B2 | * | 1/2003 | Agata et al. | 361/679.05 |
| 7,537,189 B2 | * | 5/2009 | Jung et al. | 248/298.1 |
| 7,925,310 B2 | * | 4/2011 | Chiu | 455/575.1 |
| 8,023,283 B2 | * | 9/2011 | Cheng et al. | 361/801 |
| 2005/0152102 A1 | * | 7/2005 | Shin | 361/681 |

* cited by examiner

*Primary Examiner* — Victor Batson
*Assistant Examiner* — Matthew Sullivan
(74) *Attorney, Agent, or Firm* — Altis Law Group, Inc.

(57) ABSTRACT

An electronic device includes a first housing, a second housing covering the first housing, and two tilt mechanisms. Each of the tilt mechanisms includes a connecting rod, a first hinge bar, a second hinge bar, and a resilient element. The connecting rod is hinged to the first housing and the second housing. A first end of the first hinge bar is hinged to the first housing. A first end of the second hinge bar is hinged to the second housing. The resilient element is fixed on a second end of the first hinge bar and the second hinge bar.

14 Claims, 7 Drawing Sheets

US 8,353,083 B2

TILT MECHANISM FOR ELECTRONIC DEVICE

BACKGROUND

1. Technical Field

The present disclosure generally relates to electronic devices, and particularly to a tilt mechanism for an electronic device.

2. Description of Related Art

Nowadays, portable electronic devices such as mobile phones, laptops and personal digital assistants (PDAs) are widely used. In these portable electronic devices, slide-type portable electronic devices have been increasingly used. A slide-type portable electronic device has two housings, of which one slides over and relative to the other one to open/close the portable electronic device by a slide mechanism.

However, the slide-type portable electronic device typically only allows the two housings to slide parallel to each other. Therefore, when the slide-type portable electronic device is positioned horizontally, it can be difficult for users to view a display screen disposed on the housing.

Therefore, there is a room for improvement within the art.

BRIEF DESCRIPTION OF THE DRAWINGS

Many aspects of the tilt mechanism for electronic device can be better understood with reference to the following drawings. The components in the drawings are not necessarily to scale, the emphasis instead being placed upon clearly illustrating the tilt mechanism for electronic device. Moreover, in the drawings, like reference numerals designate corresponding parts throughout the several views.

DETAILED DESCRIPTION

Figure 1:
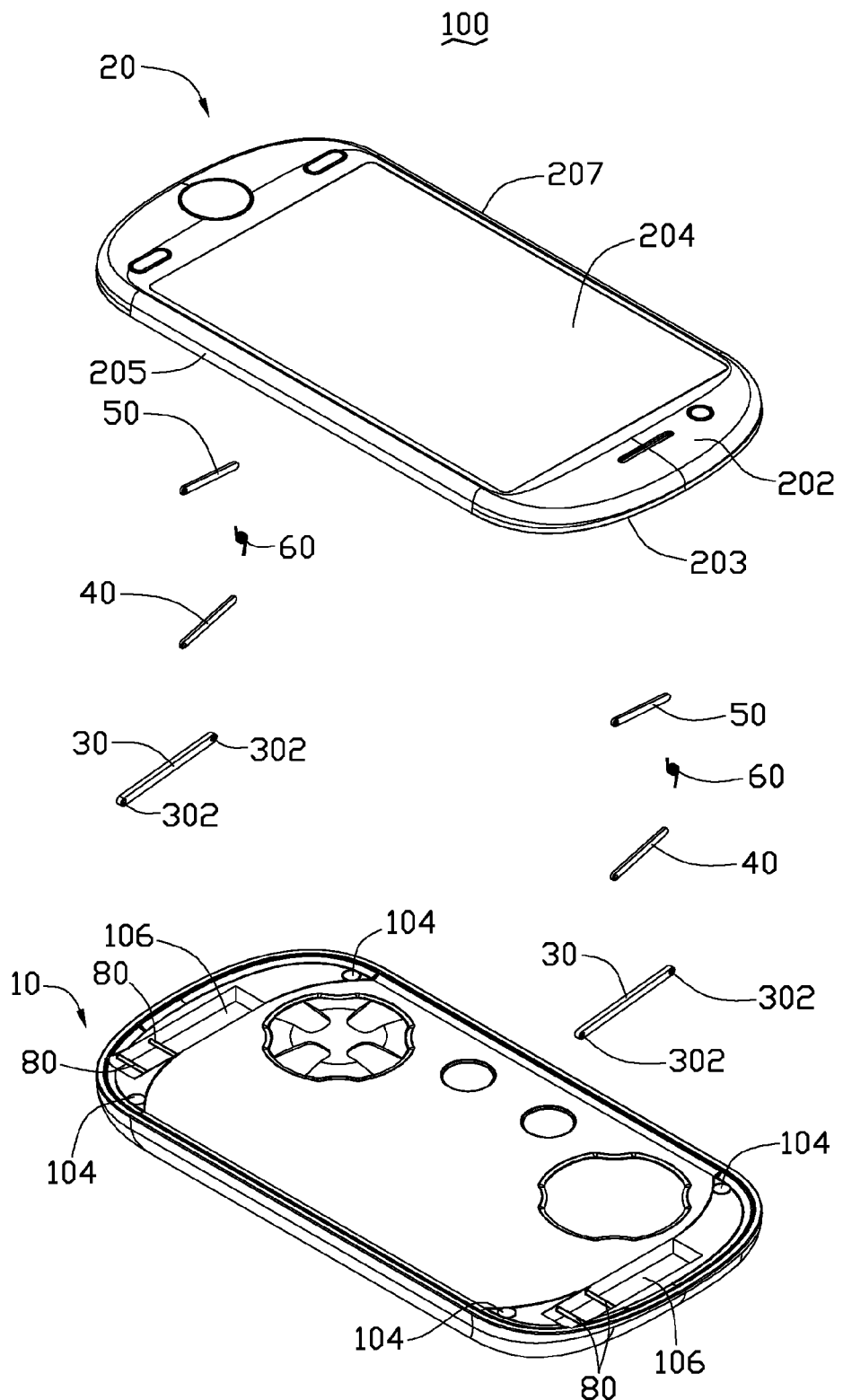
FIG. 1 is an exploded, isometric view of an electronic device according to an exemplary embodiment.
Figure 2:
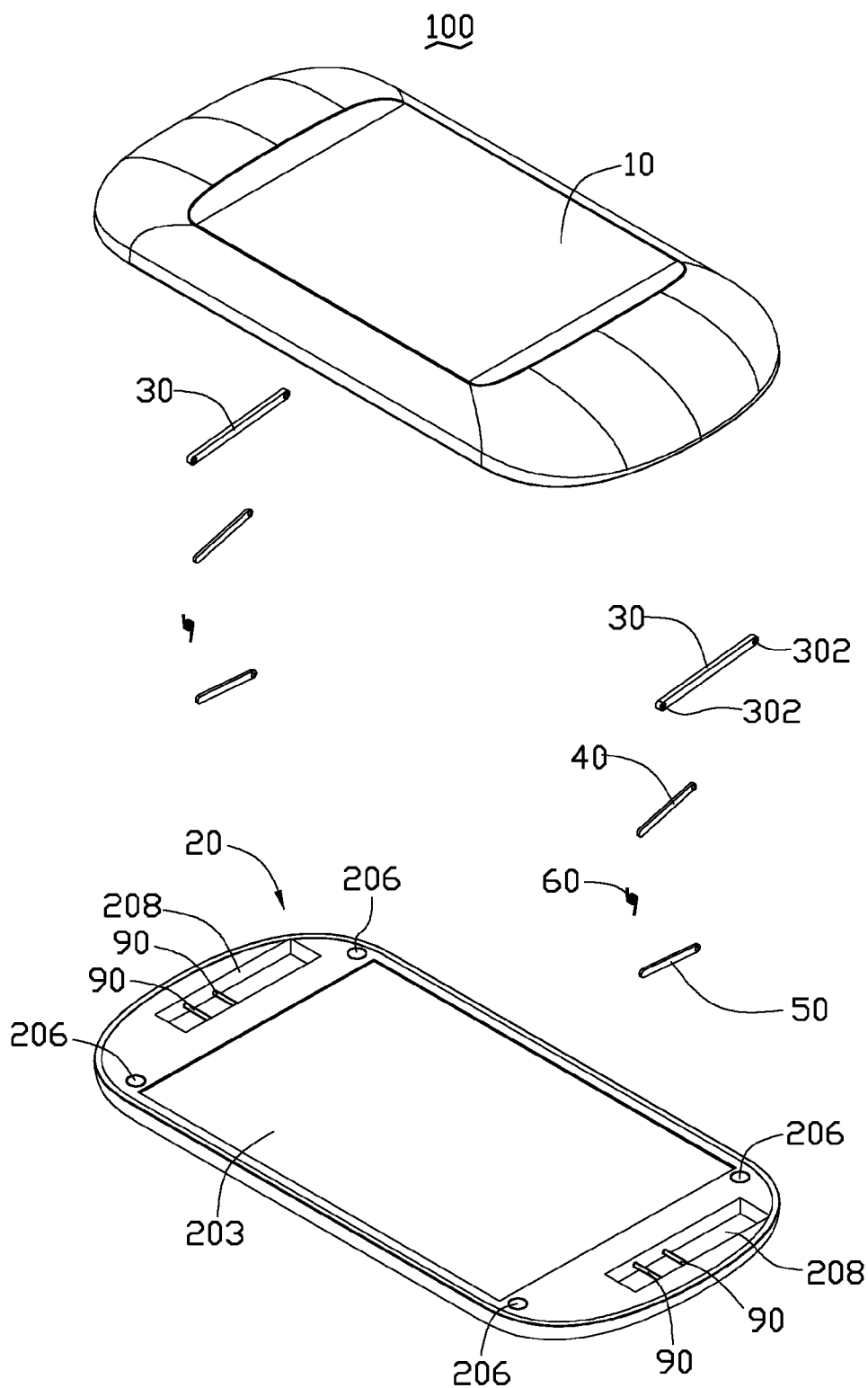
FIG. 2 is an exploded, isometric view of the electronic device shown in FIG. 1, but shown from another angle.

FIG. 1 and FIG. 2 show an exemplary embodiment of an electronic device 100, such as a mobile phone, a personal digital assistant, and so on. The electronic device 100 includes a first housing 10, a second housing 20, two connecting rods 30, two first hinge bars 40, two second hinge bars 50, two resilient elements 60, a plurality of removable fixing posts 80, and a plurality of removable positioning posts 90. In a closed state, the first housing 10 and the second housing 20 overlap each other. In a tilted state, the second housing 20 may be angularly adjusted relative to the first housing 10 for better viewing.

The first housing 10 may include first magnets 104 disposed at corners thereof. Two first slots 106 are symmetrically defined in two ends of the first housing 10. Two spaced fixing posts 80 span each of the first slots 106.

The second housing 20 includes a first surface 202, an opposite second surface 203, a first edge 205, and an opposite second edge 207. The first surface 202 includes a display screen 204 positioned thereon. The second housing 20 can be angularly tilted relative to the first housing 10 for better viewing of screen 204 when the electronic device 100 is in the closed state or the tilted state. Second magnets 206 may be disposed at corners of the second surface 203 corresponding to the first magnets 104. The exposed magnetic pole of the second magnets 206 is opposite with that of the first magnets 104. The first magnets 104 and the second magnets 206 generate attracting force to attract the first housing 10 to the second housing 20. Two second slots 208 are symmetrically defined in two ends of the second housing 20. Two spaced positioning posts 90 span each of the second slots 208.

Each end of the connecting rods 30 defines a through hole 302. The connecting rods 30 can be hinged to the first slots 106 and the second slots 208 by the positioning posts 90 and the fixing posts 80. The connecting rods 30 are configured for allowing and supporting the second housing 20 to move from the closed state to the tilted state.

Figure 3:
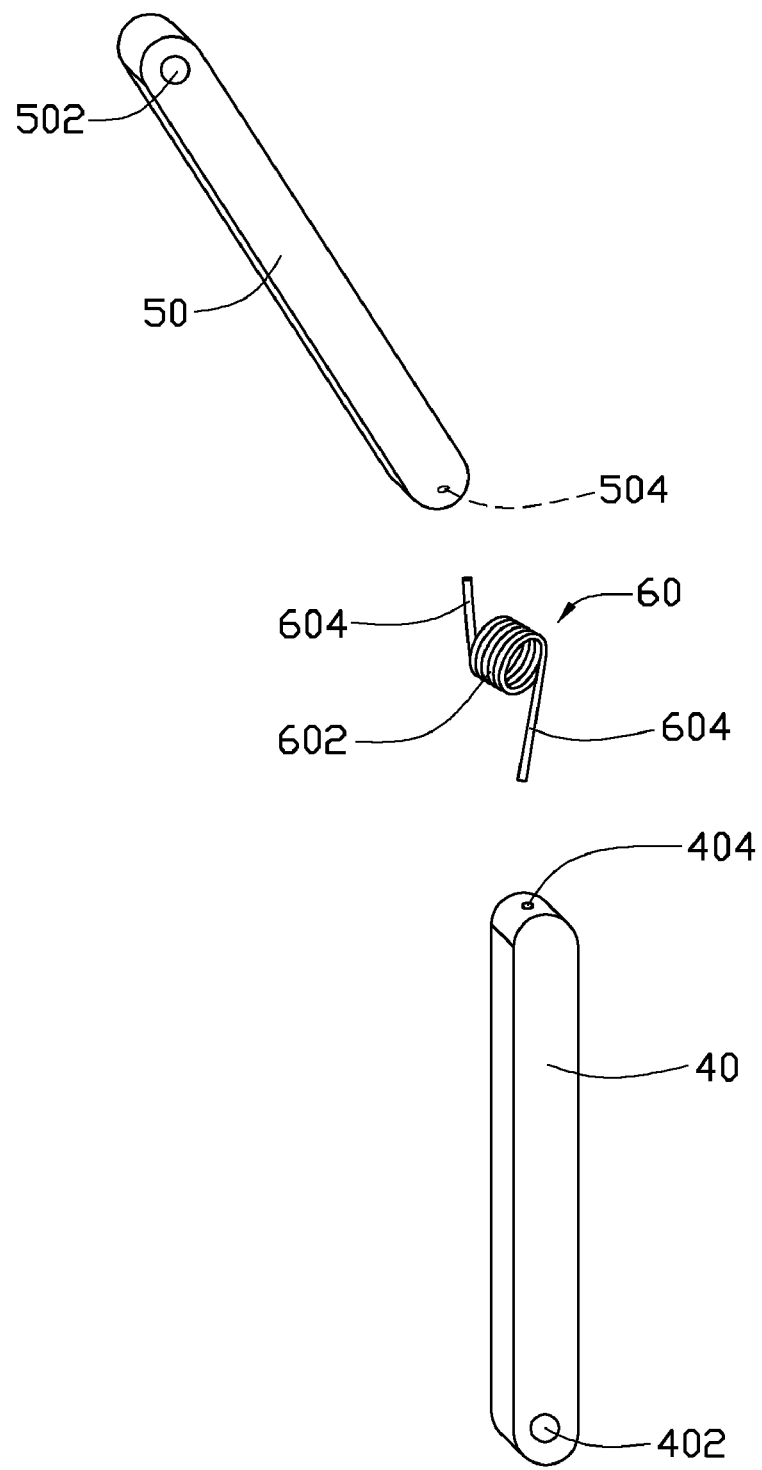
FIG. 3 is an isometric view of a first hinge bar, a second hinge bar, and a resilient element used in the electronic device shown in FIG. 1.
Figure 4:
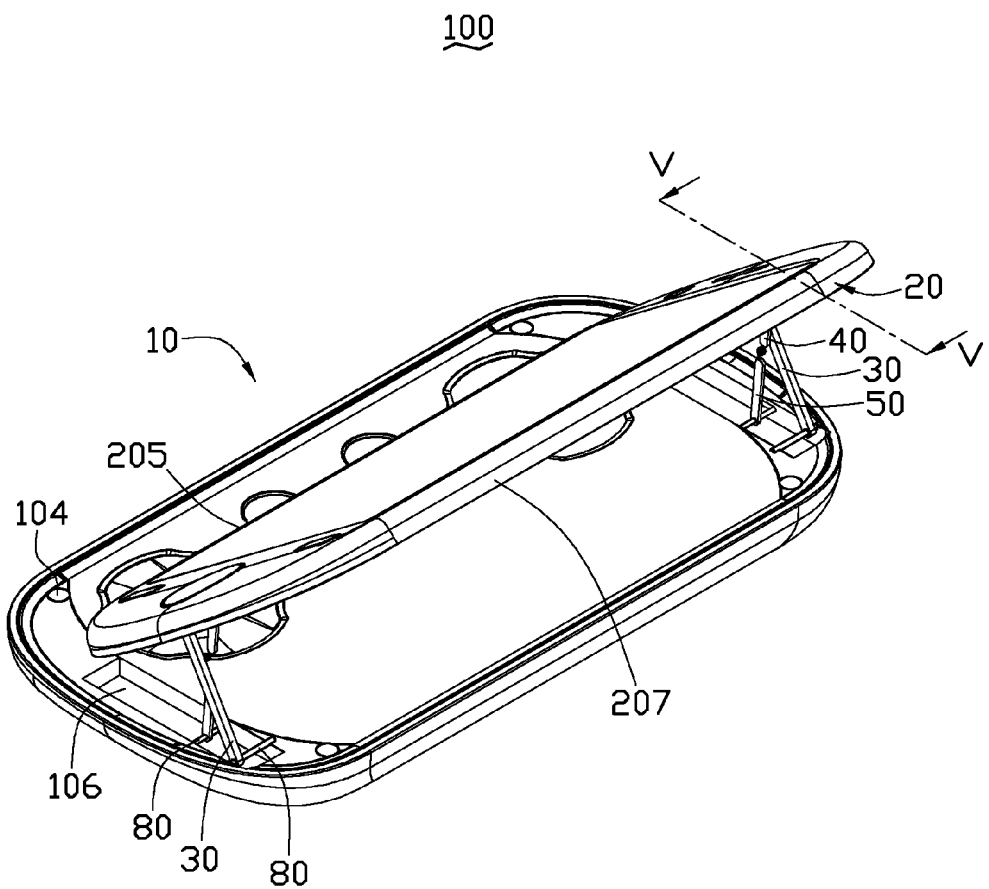
FIG. 4 is an isometric view of the electronic device of FIG. 1 in an opened state.
Figure 5:
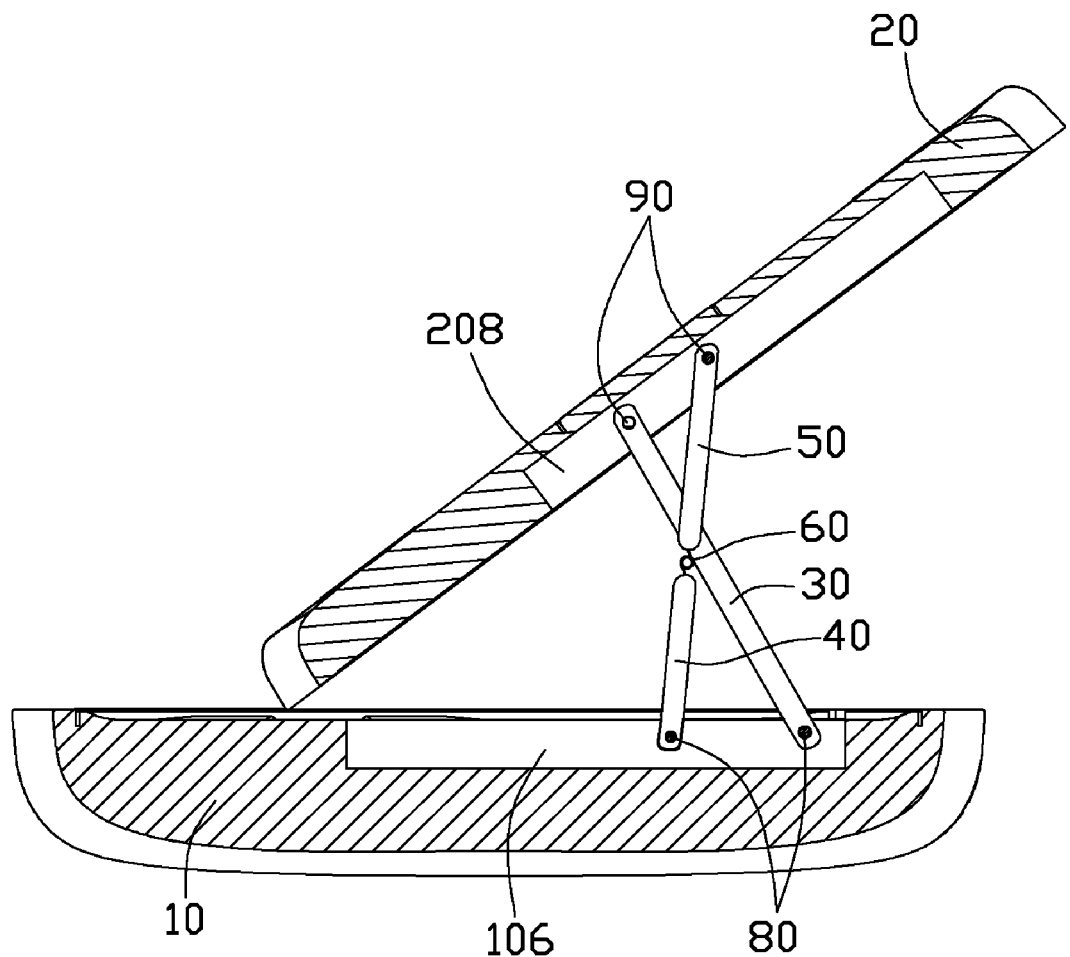
FIG. 5 is a cross-sectional view of the electronic device taken along line V-V of FIG. 4.
Figure 6:
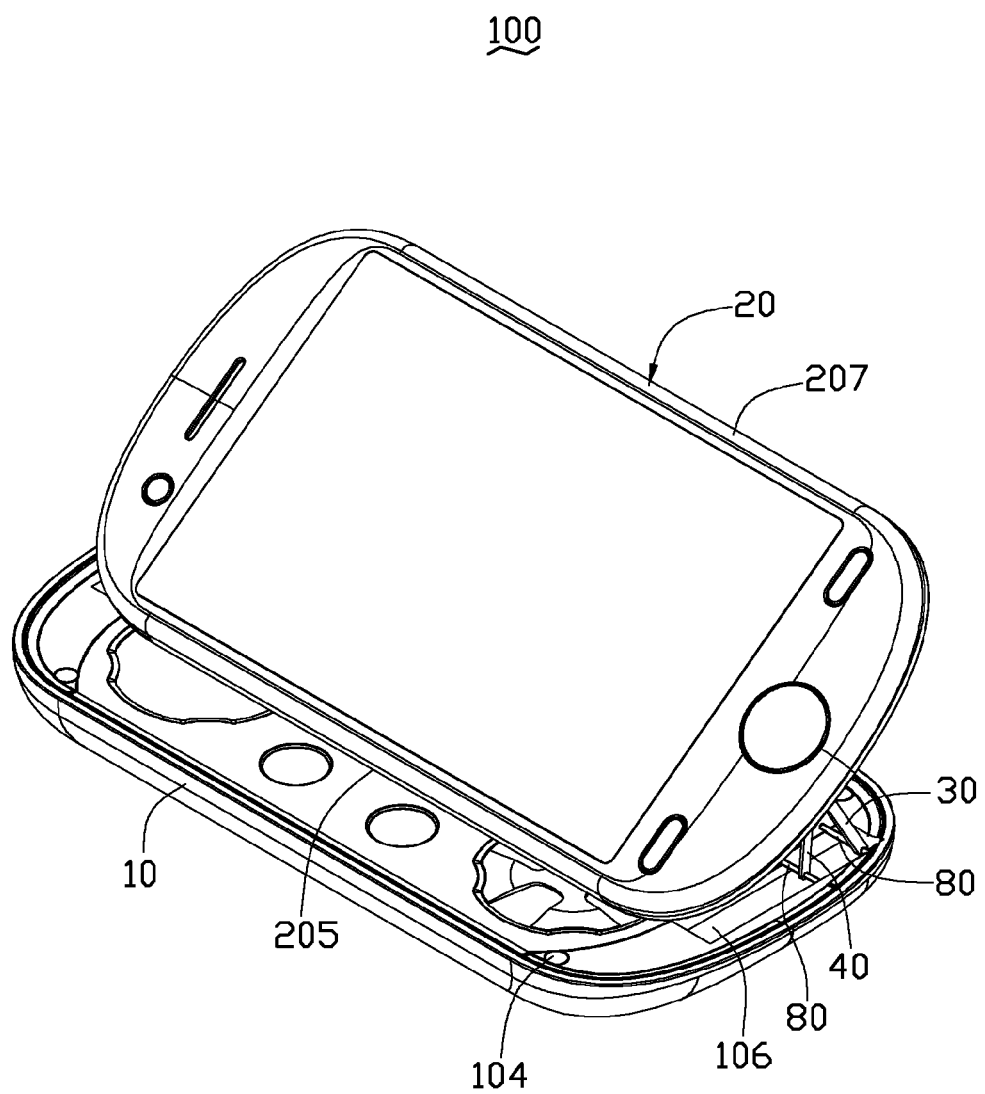
FIG. 6 is an isometric view of the electronic device shown in FIG. 4, but shown from another angle.
Figure 7:
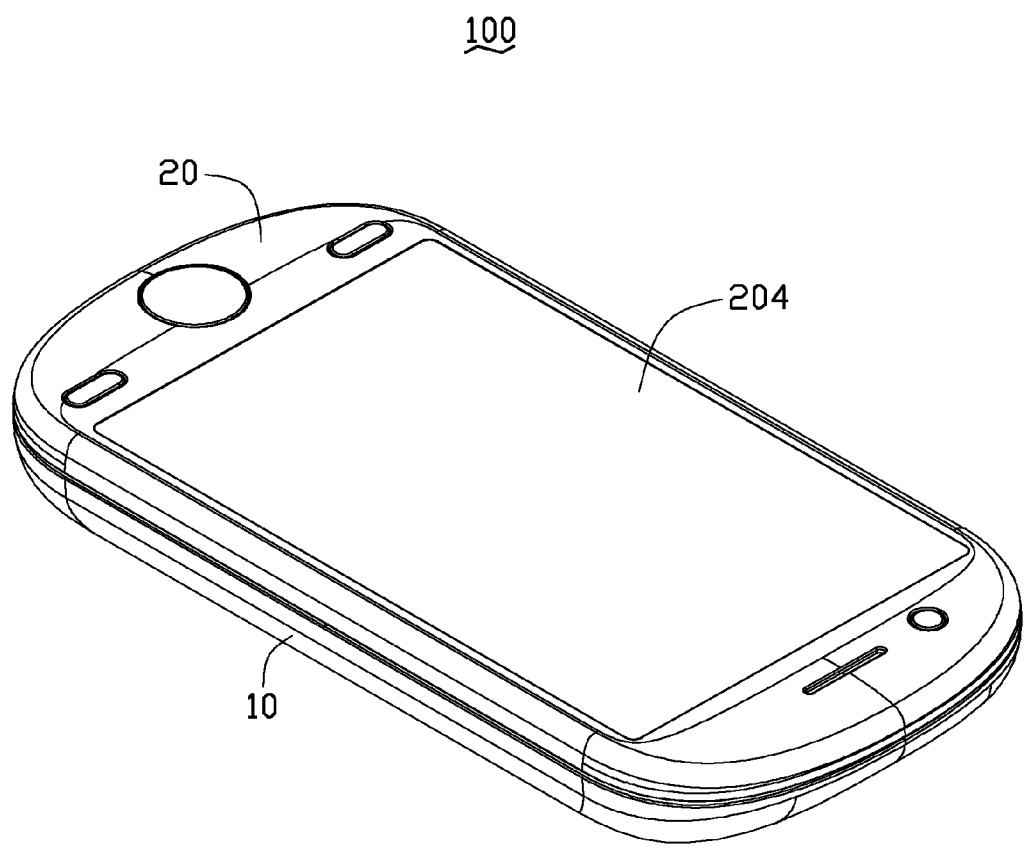
FIG. 7 is an isometric view of the electronic device of FIG. 6 in a closed state.

The first hinge bars 40 and the second hinge bars 50 have the same configuration. Referring to FIG. 3, each end of the first hinge bars 40 and the second hinge bars 50 defines a connecting hole 402, 502. The first hinge bars 40 and the second hinge bars 50 can be hinged to the first slots 106 and the second slots 208 by the positioning posts 90 and the fixing posts 80 passing through the connecting holes 402, 502, respectively. A fixed hole 404, 504 is respectively defined in an end of the first hinge bars 40 and the second hinge bars 50 along a longitudinal direction thereof.

Each of the resilient elements 60 is a torsion spring, and includes a coiling portion 602 and two connecting portions 604 extending from two ends of the coiling portion 602. An obtuse angle is defined between the connecting portions 604 when the resilient element 60 is in the relaxed state. The connecting portions 604 can be inserted into the fixed holes 404, 504. Thus, the first hinge bars 40 and the second hinge bars 50 are connected by each of the resilient elements 60. The first hinge bars 40, the second hinge bars 50, and the resilient elements 60 are configured for rotating and supporting the second housing 20 from the closed state to the tilted state. When an external force is applied on the first hinge bars 40 and the second hinge bars 50 and the first housing 10 is kept stationary, the resilient element 60 is compressed to generate an elastic potential energy, and the obtuse angle reduces gradually. When the external force is released, the resilient element 60 returns to the relaxed state.

Referring to the FIGS. 3 to 6, in assembly, one positioning post 90 is inserted into the through hole 302 of one connecting rod 30, and two ends of the positioning post 90 are fixed to the second slot 208. One fixing post 80 is inserted into the other through hole 302 of the connecting rod 30 and the two ends of the fixing post 90 are fixed to the second slot 208. Thus, the two ends of one of the connecting rod 30 may rotate about one of the positioning posts 90 and one of the fixing posts 80. Thus, the connecting rod 30 can rotate relative to the first housing 10 and the second housing 20. The connecting portions 604 are inserted into the fixed holes 404, 504. Thus, the first hinge bars 40 and the second hinge bars 50 are connected by each of the resilient elements 60. One of the first hinge bars 40 and corresponding second hinge bar 50 define the obtuse angle. Another positioning post 90 is inserted into the connecting hole 402 of the first hinge bars 40. Another fixing post 80 is inserted into the connecting hole 502 of the second hinge bars 50. The first hinge bars 40 and the second hinge bars 50 are rotatably assembled in the first slots 106 and the second slots 208 by the positioning posts 90 and the fixing posts 80, respectively. Thus, the second housing 20 can rotatably assembled to the first housing 10 by the first hinge bars 40, the second hinge bars 50, and the resilient elements 60. In this state, the first edge 205 contacts the first housing 10, and the second edge 207 is tilted above the first housing 10.

When the electronic device 100 is to be closed, an external force is applied to the second housing 20 while the first housing 10 is kept stationary. The external force presses the first hinge bars 40. The first hinge bars 40 and the second hinge bars 50 rotate relative to the fixing posts 80 and the positioning posts 90 to compress the connecting portions 604. The obtuse angle reduces gradually and generates the elastic potential energy, and the first hinge bar 40 and the second hinge bar 50 gradually approach to each other. Meanwhile, the connecting rods 30 are rotated relative to the positioning posts 90 and the fixing posts 80. The first edge 205 slidably contacts the first housing 10, and the second edge 207 gradually approaches the first housing 10. When the second housing 20 contact the first housing 10, the first hinge bars 40, the second hinge bars 50, and the connecting rods 30 are received in the first slots 106 and the second slots 208. The second magnets 206 attract the first magnets 104 by magnetic force. Therefore, the second housing 20 is locked to the first housing 10.

When the electronic device 100 is to be opened, a force is applied to the second housing 20 to move the second housing 20 away from the first housing 10 and separate the second magnets 206 and the first magnets 104, unlocking the electronic device 100. Then, the force is removed. The obtuse angle defined between the first hinge bars 40 and the second hinge bars 50 increases gradually because the resilient elements 60 release the elastic potential energy. Thus, the first bars 40 and the second bars 50 are gradually separated by the resilient elements 60. The first hinge bars 40 and the second hinge bars 50 respectively push the first housing 10 and the second housing 20 to open the electronic device 100. Meanwhile, the connecting rods 30, the first hinge bars 40, and the second hinge bars 50 rotates relative to the second housing 20 and the first housing 10. The connecting rods 30 support the second housing 20 on the first housing 10 when the electronic device 100 is fully opened. The second housing 20 is supported in tilted position relative to the first housing 10.

It is to be understood that one connecting rod 30, one first hinge bar 40, one second hinge bar 50, and one resilient element 60 can be defined as a tilt mechanism. Thus, the electronic device 100 according to the exemplary embodiment includes two tilt mechanisms.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An electronic device comprising:
a first housing including first magnets;
a second housing attached to the first housing, the second housing including second magnets corresponding to the first magnets to position the first housing relative to the second housing; and
two tilt mechanisms connecting the first housing to the second housing, each of the tilt mechanisms comprising:
a connecting rod rotatably connecting the first housing and the second housing;
a first hinge bar, a first end of the first hinge bar rotatably connecting to the first housing;
a second hinge bar, a first end of the second hinge bar rotatably connecting to the second housing; and
a resilient element fixed on a second end of the first hinge bar and the second hinge bar;
wherein when the second housing slides relative to the first housing, each connecting rod rotates relative to the second housing and the first housing, the first hinge bar rotates relative to the second hinge bar by the resilient element, thereby tilting the second housing.

2. The electronic device as claimed in claim 1, wherein the resilient element comprises a coiling portion and two connecting portions extending from two ends of the coiling portion; the connecting portions are respectively fixed in the second end of the first hinge bar and the second hinge bar.

3. The electronic device as claimed in claim 2, wherein the second end of the first hinge bar and the second hinge bar respectively defines a fixed hole, the connecting portions respectively are inserted into the fixed hole.

4. The electronic device as claimed in claim 2, wherein the first hinge bar and the second hinge bar define an obtuse angle when the second housing is tilted above the first housing; when the second housing is closed to the first housing, the obtuse angle reduces gradually.

5. The electronic device as claimed in claim 1, wherein the first housing symmetrically defines two first slots, the second housing symmetrically defines two second slots corresponding to the first slots; the connecting rods are hinged to the first slots and the second slots, the first end of the first hinge bars are hinged to the first slots and the second hinge bars are hinged to the second slots.

6. The electronic device as claimed in claim 1, wherein the resilient element is a torsion spring.

7. An electronic device comprising:
a first housing;
a second housing covering the first housing, the second housing comprising a first edge and an opposite second edge ; and
two tilt mechanisms connecting the first housing to the second housing, each of the tilt mechanisms comprising:
a connecting rod including a first end and a second end, the first end of the connecting rod hinged to the first housing and the second end of the connecting rod hinged to the second housing;
a first hinge bar, a first end of the first hinge bar rotatably connected to the first housing, the first end of the connecting rod at a front of the first end of the first hinge bar;
a second hinge bar, a first end of the second hinge bar rotatably connected to the second housing, the second end of the connecting rod at a back of the first end of the second hinge bar; and
a resilient element fixed on a second end of the first hinge bar and the second hinge bar;
wherein when the second housing slides relative to the first housing, each connecting rod rotates relative to the second housing and the first housing,; the first hinge bar rotates relative to the second hinge bar by the resilient element to exert a force between the first housing and the second housing, the first edge slidably contacts the first housing, the second housing rotates to tilt the second edge away from the first housing.

8. The electronic device as claimed in claim 7, wherein the resilient element comprises a coiling portion and two connecting portions extending from two ends of the coiling portion; the connecting portions are respectively fixed in the second end of the first hinge bar and the second hinge bar.

9. The electronic device as claimed in claim 8, wherein the second end of the first hinge bar and the second hinge bar respectively defines a fixed hole, the connecting portions respectively are inserted into the fixed hole.

10. The electronic device as claimed in claim 8, wherein the first hinge bar and the second hinge bar define an obtuse angle when the second housing is tilted above the first housing; when the second housing is closed to the first housing, the obtuse angle reduces gradually.

11. The electronic device as claimed in claim 7, wherein the first housing symmetrically defines two first slots, the second housing symmetrically defines two second slots corresponding to the first slots; the connecting rods are hinged to the first slots and the second slots, the first end of the first hinge bars are hinged to the first slots and the second hinge bars are hinged to the second slots.

12. The electronic device as claimed in claim 7, wherein the first housing comprises first magnets, the second housing comprises second magnets corresponding to the first magnets to position the first housing relative to the second housing.

13. The electronic device as claimed in claim 7, wherein the resilient element is a torsion spring.

14. An electronic device comprising:
a first housing symmetrically defining two first slots;
a second housing covering the first housing, the second housing symmetrically defining two second slots corresponding to the first slots, and comprising a first edge and an opposite second edge ; and
two tilt mechanisms connecting the first housing to the second housing, each of the tilt mechanisms comprising:
a connecting rod hinged to the connecting rods are hinged to the first slot of the first housing and the second slot of the second housing;
a first hinge bar, a first end of the first hinge bar rotatably connected to the first slot of the first housing;
a second hinge bar, a first end of the second hinge bar rotatably connected to the second slot of the second housing; and
a resilient element fixed on a second end of the first hinge bar and the second hinge bar;
wherein when the second housing slides relative to the first housing, each connecting rod rotates relative to the second housing and the first housing,; the first hinge bar rotates relative to the second hinge bar by the resilient element to exert a force between the first housing and the second housing, the first edge slidably contacts the first housing, the second housing rotates to tilt the second edge away from the first housing;
wherein the first housing comprises first magnets, the second housing comprises second magnets corresponding to the first magnets to position the first housing relative to the second housing.

* * * * *